Aug. 23, 1966 R. L. CONRATH ET AL 3,267,703

AUTOMATIC WASHER

Filed June 1, 1964 9 Sheets-Sheet 1

Inventor
Richard L. Conrath
Clarence M. Overturf
By Peter S. Lucyshyn
Att'y

Inventor
Richard L. Conrath
Clarence M. Overturf
By Peter S. Lucyshyn Att'y

Aug. 23, 1966 R. L. CONRATH ET AL 3,267,703

AUTOMATIC WASHER

Filed June 1, 1964 9 Sheets-Sheet 3

Inventor
Richard L. Conrath
Clarence M. Overturf
By Peter S. Lucyshyn Att'y

AUTOMATIC WASHER

Filed June 1, 1964

Inventor
Richard L. Conrath
Clarence M. Overturf
By Peter S. Lucyshyn
Att'y.

AUTOMATIC WASHER

Filed June 1, 1964 9 Sheets-Sheet 5

Inventor
Richard L. Conrath
Clarence M. Overturf
By Peter S. Lucyshyn
Atty

Inventor
Richard L. Conrath
Clarence M. Overturf
By Peter S. Lucyshyn Atty.

Inventor
Richard L. Conrath
Clarence M. Overturf
By Peter S. Lucyshyn Att'y

Inventor
Richard L. Conrath
Clarence M. Overturf
By Peter S. Lucyshyn Att'y.

Inventor
Richard L. Conrath
Clarence M. Overturf
By Peter S. Lucyshyn
Att'y.

3,267,703
AUTOMATIC WASHER

Richard L. Conrath, Herrin, and Clarence M. Overturf, Carterville, Ill., assignors to Borg-Warner Corporation, Chicago, Ill., a corporation of Illinois
Filed June 1, 1964, Ser. No. 371,347
3 Claims. (Cl. 68—23)

The present invention relates to a drive mechanism for a washing machine and more particularly to a brake structure for such a drive mechanism.

It is important in the operation of an automatic washer that a brake be provided to retard rotation of a basket. During the wash-agitate cycle the brake must hold the basket against free movement as an agitator rotatably disposed inside the basket is oscillated to and from. At the same time the brake must permit some slip to cushion the change of direction occurring in the operation of the agitator. Also, in the event a washer access door is opened during spinning of the basket, it is necessary to provide an emergency stop of basket rotation. In addition, during the normal operation of a washer, the brake must retard basket rotation following a spin cycle in order for the motor direction to be reversed so that an agitate cycle can be started. It is desirable to have the brake operate quietly both to reduce wear as well as not to upset the housewife using the machine.

Accordingly, it is an object of the present invention to provide a simply operable brake structure which can be engaged during rotation of the drive train mechanism in either the agitate direction or in the opposite spin direction and which is customarily quiet operating. The present invention finds advantageous, but by no means exclusive, use in an automatic washer having a spin drive train connected to a basket where it is necessary for sequential operation of the washer to selectively brake and release the drive train to control rotation of the basket.

It is a more particular object of the present invention in accordance with the above to provide a brake of the band type which is operative to effect braking when the band is held against rotation and which permits engagement of the brake band in either direction of rotation as well as within a predetermined wide range of rotational speeds.

It is an object of the present invention in accordance with the above to provide a brake structure which is reliable and versatile in use yet is economical to manufacture and easy to adapt for use in standard automatic washers.

These and other objects and advantages of the invention will become more clearly understood from the description of the drawings in which.

*General*

Figures 1, 9:
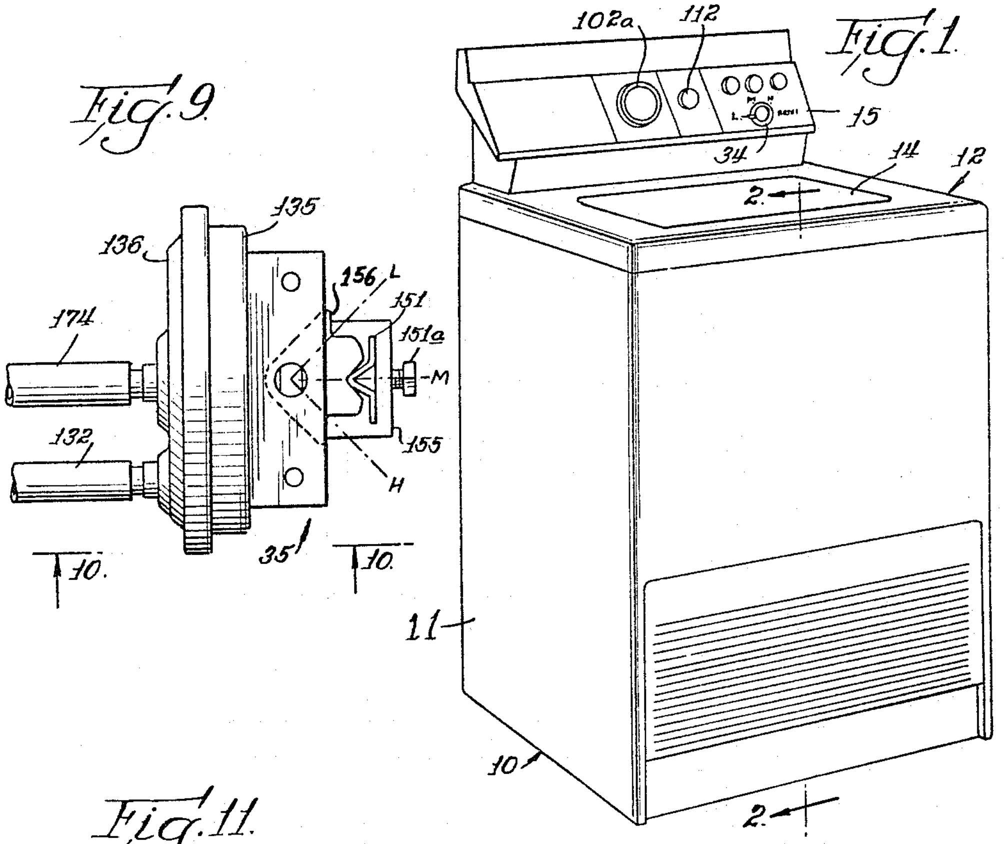
FIGURE 1 is a perspective of an automatic washing machine embodying the present invention.
FIGURE 9 is a plan view of a combination water level pressure and clutch control switch.
Figure 2:
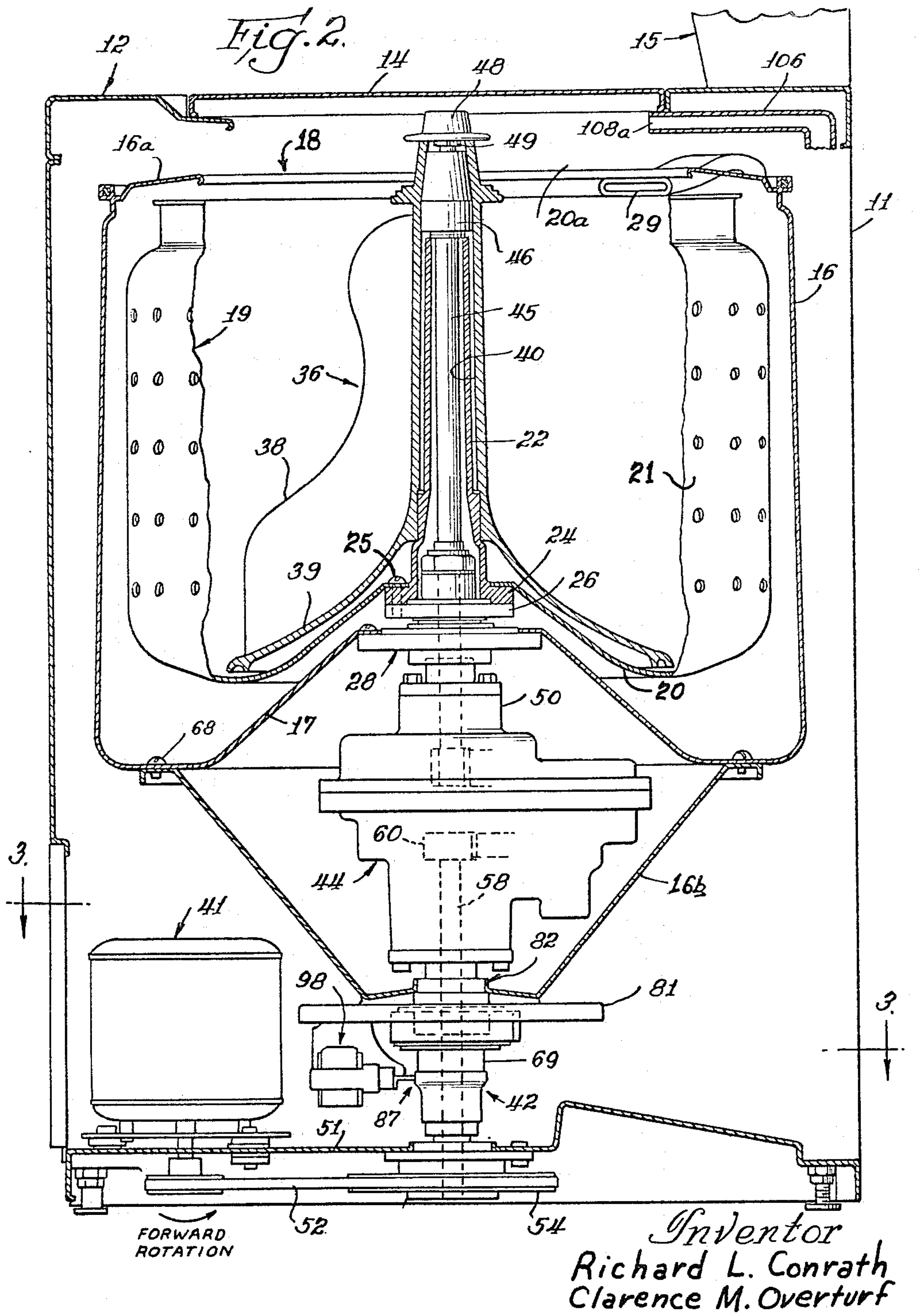
FIGURE 2 is a sectional elevation taken along 2—2 in FIGURE 1.

Referring now to the drawings, shown in FIG. 1 is an automatic washer 10 in which the present invention finds particular applicability. The automatic washer 10 includes an outer cabinet 11 having a top 12 hingedly supporting a loading and unloading door 14 and carrying a backguard 15 on which are mounted controls for the washing machine. As best shown in FIG. 2, a tub 16 having an annular cover 16*a* is provided inside the cabinet 11 having a bottom 17 and a top opening 18 beneath the door 14. Forming a container for clothes or other articles to be washed is a perforate basket 19 having a bottom 20, top opening 20*a* and sides 21 mounted on a vertically disposed center post 22 inside the tub 16.

Relative rotation between the tube and basket is permitted. In the present instance this is achieved by fastening the bottom 20 of the basket to a center post base 24 using screws 25 (one of which is shown). The center post base 24 is anchored to a spin hub 26 which is rotatably journalled in a bearing assembly 28 mounted in the tub bottom 17.

For feeding water into the tub to wash or rinse the clothes, a flume 29 is provided mounted in the tub cover 16*a* (opening 18). The flume is connected by a hose and conduit 30 to a water input control valve 31 (see FIG. 12). In the illustrative embodiment the level of water is selected by positioning a rotatable control knob 34 which is connected to a water level control switch 35, in the present instance a pressure responsive switch. The pressure switch control for providing a selected level of liquid in the tub is discussed in further detail subsequently, it is here noted that the selector control 34 can be moved to one of three positions, low, medium, or high for providing these relative levels of liquid in the tub. (See FIGS. 1 and 9.)

To agitate the clothes during washing or rinsing, the basket 19 is held stationary while an agitator 36 having a plurality of vanes 38 and a skirt 39 is oscillated to and fro. The agitator has a central opening 40 for receiving the center post 22 and is rotatably supported thereon. The center post remains stationary while the agitator oscillates.

After the tub has been filled to the level selected by control 34, a wash cycle of operation begins. At this time reversible oscillatory drive is transmitted to agitator 36 from a motor 41 through a first drive train including a lower drive assembly 42, a transmission 44 and an agitator drive shaft 45 (see FIG. 2). In the exemplary embodiment, the drive shaft 45 extends centrally through the hollow center post 22 and carries a drive block 46 at its upper end. The upper end of the agitator central opening 40 is formed to engage the drive block 46 so that the two structures turn as a unit. For maintaining the agitator seated on the drive block, a cap 48 is threaded on a stud 49 extending from the upper end of the drive block 46.

After the wash cycle is completed, wash water is pumped out of the machine and the basket 19 is spun at a relatively high speed to extract wash water from the clothes. The side walls 21 of the basket are perforated so that the water is expelled therethrough. Describing a second drive train for effecting spin rotation of the basket 19, the lower drive assembly 42 is constructed so as to rotate the transmission 44 as a unit including a transmission housing 50. The housing 50 is coupled to the spin hub 26 which supports the center post 22 and basket 19. Accordingly, spinning of the transmission effects rotation of the basket 19.

*First and second drive trains*

Figures 3, 4:
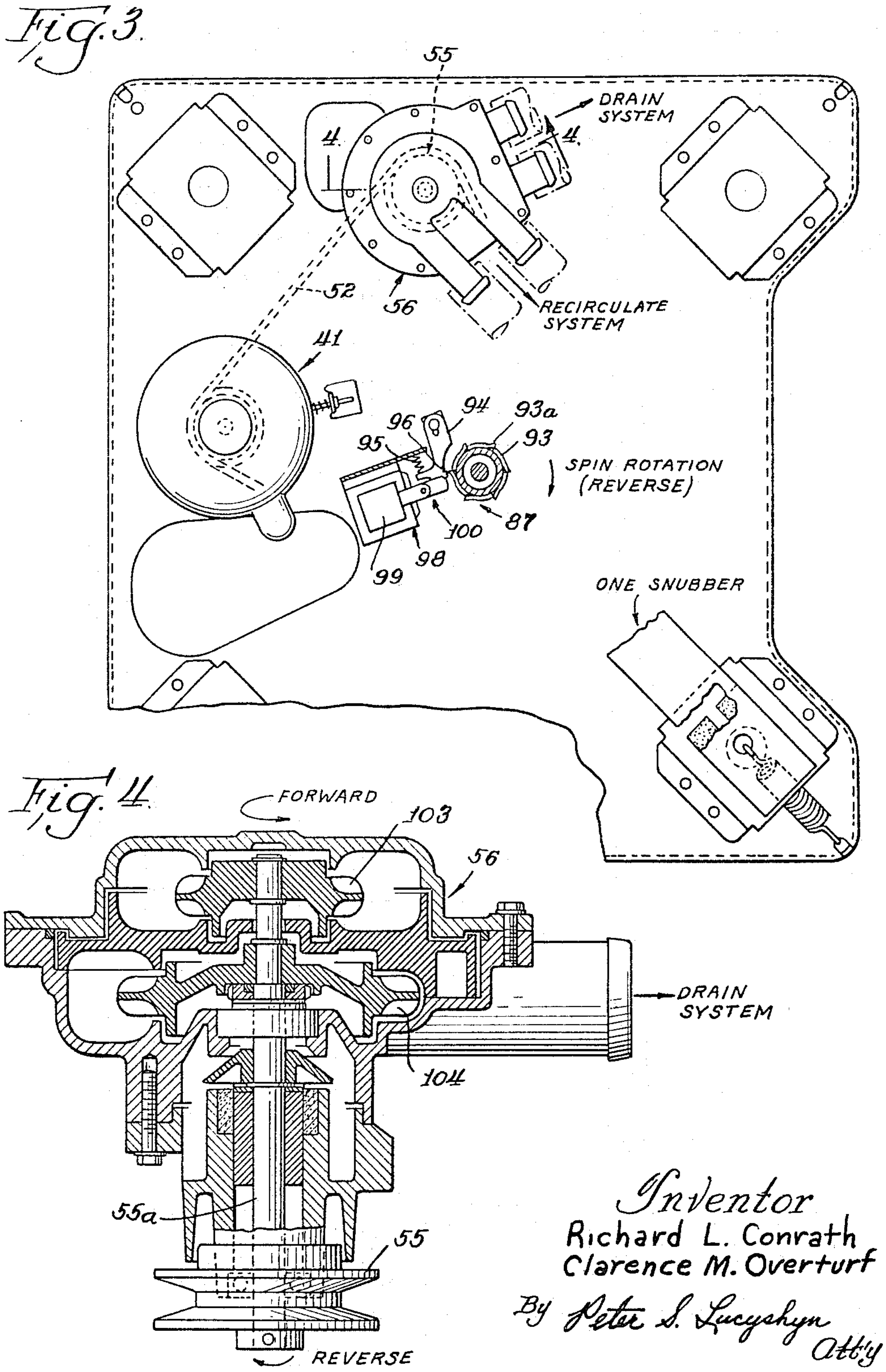
FIGURE 3 is a plan view of the washing machine base assembly, taken along line 3—3 of FIG. 2.
FIGURE 4 is an enlarged sectional elevation of a washing machine pump taken along 4—4 in FIGURE 3.
Figure 5:
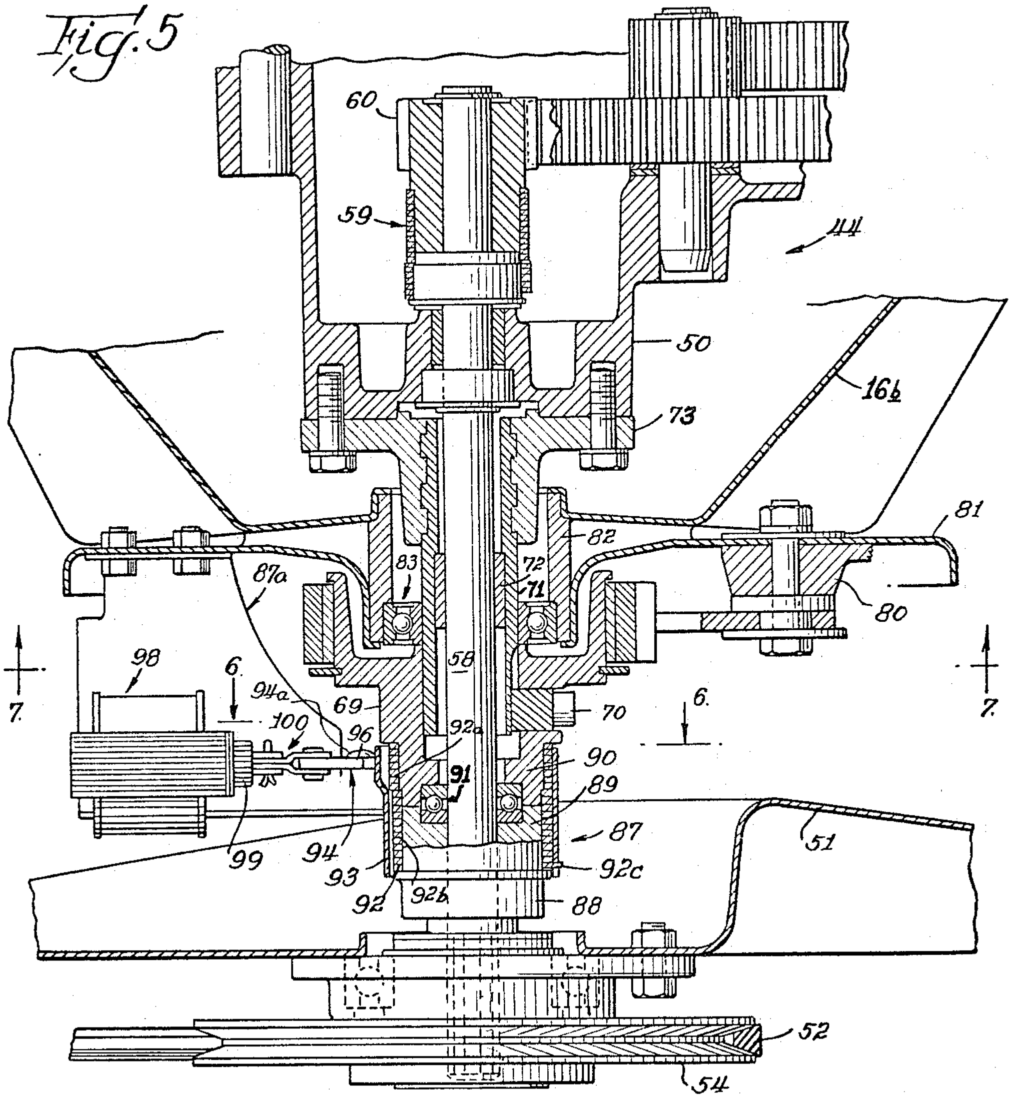
FIGURE 5 is a vertical sectional view of the drive mechanism of the washing machine.

Turning to the respective drive trains in the illustrative washing machine in more detail, the motor 41 is mounted in inverted fashion on a base plate 51 extending across the bottom of the washing machine 10 (see FIGS. 2, 3). The motor has a drive shaft which extends below the mounting plate 51 and carries a drive pulley which is coupled by a belt 52, in the present instance, a V-drive belt, to a pair of driven pulleys 54, 55, one pulley 54 coupled to drive the lower drive assembly 42 and the other pulley 55 coupled to drive a twin impeller pump 56. As is explained subsequently, pump 56 operates selectively as a recirculation pump or as a drain pump. Each of the driven pulleys are disposed below the base plate 51 while the driven mechanisms, the lower drive assembly 42, and the pump 56 are mounted atop the base plate 51. The driven pulley 54 is suitably fastened, in the present instance by a spline and key fit (see FIG. 5), to a main drive shaft 58 extending upwardly from the pulley 54 through the lower drive assembly 42. The upper end of shaft 58 is coupled via an overrunning or one-way spring clutch 59 to a transmission including a drive pinion 60. The transmission is shown and described in Gerhardt et al. U.S. Patent No. 2,807,951, assigned to Borg-Warner Corporation. The one-way spring clutch 59 provides drive to the transmission drive pinion 60 to transmit an oscillatory drive to the agitator during forward rotation of drive shaft 58, while disconnecting drive to pinion 60 during reverse rotation of shaft 58. Accordingly, to effect oscillation of the agitator, the drive shaft 58, as a part of the first drive train, is rotated in a forward direction thereby operating the one-way clutch 59 so that the gear train in the transmission 44 effects oscillation of agitator drive shaft 45.

As described, the basket 19 is rotatable with respect to the tub 16. It is, however, undesirable during the agitation cycle to have the basket freely moving. At the same time, washer operation is smoothed and motor strain is reduced by permitting slight movement of the basket at the point where the agitator reverses direction in its oscillatory operation.

In the spin operation of the washer, following high speed spinning of the basket, structure must be provided to slow down and stop the basket to permit the next operation of the washer. For example, it is necessary to stop basket spinning after an initial suds removal period and reverse the motor to operate the first drive train and oscillate the agitator. Also, an emergency stop must be provided in order to stop the basket during high spin to prevent injury in case the housewife opens the access door.

In accordance with the present invention, the second or basket spin drive train is provided with a selectively operable braking means which can be engaged in either direction of rotation of the drive train, i.e. either the agitate direction of rotation or the spin direction of rotation, and which effectively holds the basket during agitate operation and stops it upon engagement in the event of power interruption during high speed spin, or at the end of a high speed spin cycle of operation of the washer. As herein illustrated, a braking assembly 64 includes a brake hub 69 suitably fastened, in the present instance by a clamp 70, to a tube or basket drive shaft 71 coaxial with the main drive shaft 58 and rotatably held with respect thereto by a bearing 72. A hub 73 is cast on the upper end of the basket tube 71. The hub 73 is fastened to the lower end of the transmission housing 50. Accordingly, the tube 71 and the transmission housing 50 operate as a unit. These are a part of the second drive train for controlling rotation of the basket 19. Thus, in the present instance, the tube 71 can be held stationary to hold the transmission housing and basket against rotation, while on the other hand the tube or shaft 71 can be permitted to move or rotate thereby permitting the basket to move or rotate.

Figure 7:
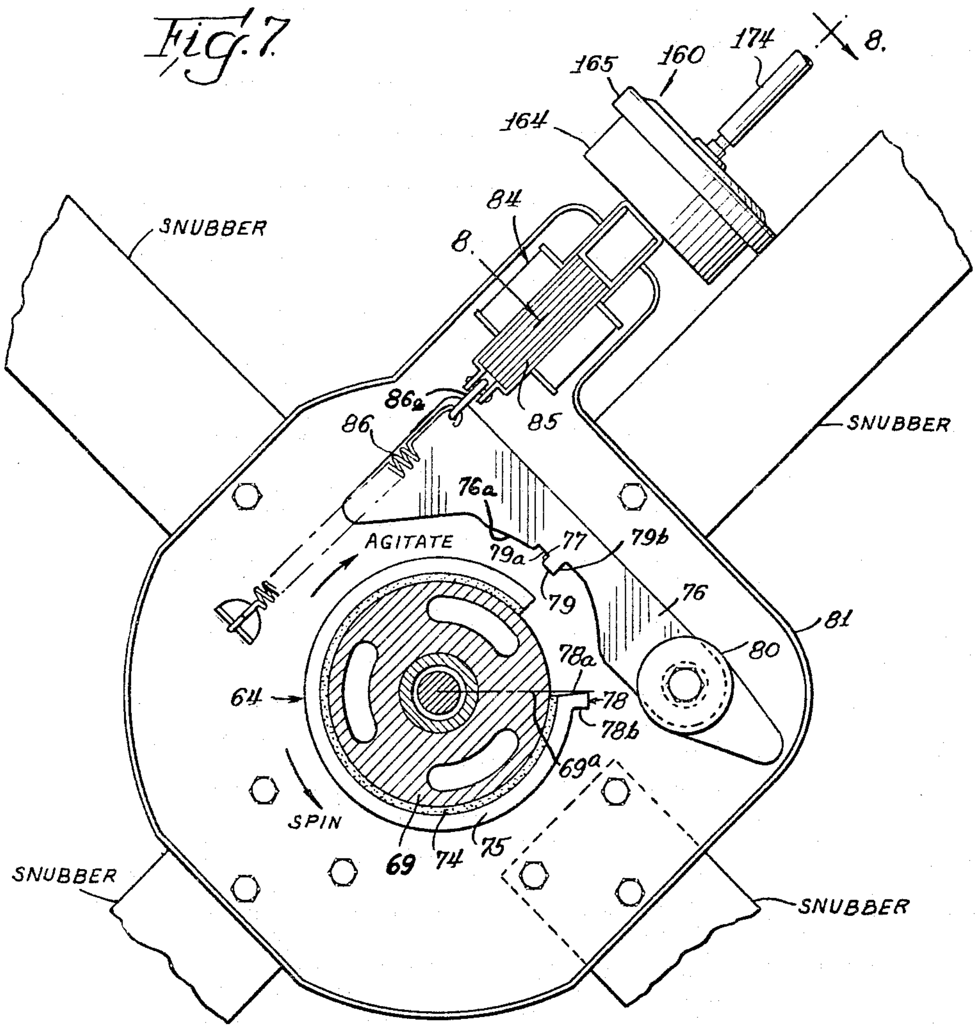
FIGURE 7 is a plan view of a brake assembly of the drive mechanism of FIGURE 5, said view being taken along 7—7 in FIGURE 5.

To retard basket rotation, as exemplarily shown, the brake assembly 64 includes the brake hub 69 and friction applying means, here shown as a brake lining 74, preferably disposed for rubbing engagement with the hub and carried by a brake band 75. The brake band 75 is constructed of suitable material, for example, spring steel to tightly hold the brake lining against the hub. As shown in FIG. 7, braking is effected, in either direction of second drive train and brake band rotation, by selectively holding the brake band against rotation, in the illustrated embodiment, by engaging a brake latch 76. For this purpose the brake band has a catch, here shown as an integral tang 78, engaging part of the latch catch structure, here shown as a projecting finger 79. The latch 76 is pivotally mounted on a brake latch pedestal 80 depending from a brake support bracket 81. The bracket 81 is mounted on a suspension tube 82 which is supported in a bearing 83 carried in the brake hub 69.

It is clear that the latch is disposed for selective operation toward and away from the braking means. The brake latch 76 is normally biased so that the fingers 79 engages the brake band tang 78. To this end, a biasing spring 86 is carried by the brake bracket 81 so as to pivot latch 76 about pedestal 80. As presently illustrated in FIG. 7, the latch and brake band are disengaged.

First, the brake structure is described for holding the basket against movement during the agitation cycle, movement tending to occur because the oscillating agitator is coupled to the basket via the liquid contained in the tub. The brake band tang 78 is received in a latch catch structure, here shown as a recess 79*a*. Initial engagement occurs between a tang agitate-control face 78*b* and a latch finger agitate-control face 77. The latch 76 is formed with a radius 76*a* to permit the brake band tang 78 to ride into engagement with the recess 79*a*. The provision of the recess 79*a* assures the holding of the brake band 75 to retard basket 19 against rotation in either direction. Thus, as movement in both directions is imparted to the basket by the agitator acting through the fluid coupling in the tub, the brake permits slight movement to cushion the change of direction while assuring that the basket does not rotate freely.

To engage the brake in the reverse direction of rotation of the brake band, necessary during high speed spin of the basket, a spin-control face 78*a* of tang 78 is engaged with spin-control face 79*b* of finger 79. The particular problem of engagement of the two faces at high speeds without "throwing" the latch is solved, in the illustrative embodiment, by undercutting face 78*a*. As shown in the drawings, the face 79*b* of the finger receives a component of force acting substantially in line with the latch pivot point at pedestal 80. Concentrating the point of impact by using an undercut tang face 78*a* substantially eliminates components of force acting to pivot latch 76 about pedestal 80 and throwing the latch. The radius 69*a* extending to the control face 78*a* shows the undercutting of the latter. Thus, in practice catches of this construction have been consistently engageable in the spin direction with basket rotational speeds ranging upwards to approximately 600 r.p.m.

Whereas in prior art brake structures, i.e. the brake shown in Gerhardt et al. U.S. Patent No. 2,807,951, the brake latch is of a type requiring engagement during rotation in the spin direction otherwise the brake band lip and latch do not catch, the present structure permits engagement of the brake during rotation of the brake band in either direction. Thus, quieter operation is achieved in spin operation of the basket because basket rotation need not be terminated with a clashing engagement at high speed of brake latch and tang. Instead, drive can be disconnected and the basket permitted to coast to a slow speed or even to a stop before the latch is released into spring biased engagement with tang 78. The second drive train and basket 19 then rotate in the opposite direction during agitate operation of the washer, the tang 78 swinging through latch radius 76*a*, until the tang is caught by recess 79*a*.

Free rotation of the basket and second drive train, including in the present instance the brake hub and transmission housing, is permitted by disengaging the latch 76 from the brake band 75. For this purpose a solenoid 84 has an armature 85 linked by hook 86*a* to the brake latch 76 to act against the spring biasing force. Thus, when it is desired to spin the basket, the brake hub and second or spin drive train are freed for rotation by energizing the brake solenoid 84 and releasing the brake 64.

Supporting the tub is an inverted generally frustoconical shaped support 16*b* tapering down from the peripheral edge of the tub bottom to the bracket 81 and suspension tube 82 (FIG. 2). To permit limited movement or tipping of the tub, basket and drive mechanism from a vertical axis caused by unbalanced washer loads, yet to dampen any vibration, the bracket 81 is snubbed by a set of four damping assemblies which, in the present instance, connect the bracket holding the tub support 16*b* to the respective four corners of the base plate 51. Details of the snubber or damping assembly structures do not comprise any part of the present invention and thus are not described in detail herein but the structure and its effectiveness in smoothing machine operation are described in the Gerhardt et al. U.S. Patent, supra.

*Clutch*

To initiate spin rotation of basket 19, the drive shaft 58 is rotated in the reverse direction and, as a part of the second drive train, is drivingly coupled to rotate the transmission housing 50 and spin basket 19. In the present instance coupling is effected by engagement of a clutch 87 (see FIG. 5). The clutch structure and its operation are the subject of a co-pending application of Robert Beare, Serial No. 371,312, filed June 1, 1964. The preferred embodiment of the clutch 87 is of the overrunning or one-way type and transmits drive from a lower drive hub 88 to the brake hub 69. As has been explained, the brake hub is coupled to the transmission housing 50 through the basket tube 71. The lower drive hub 88 is spline-fitted on the main drive shaft 58 and held thereon by, for example, a set screw (not shown). The clutch 87 includes a lower drive column 89 and an upper driven column 90. The lower drive column 89 is an integral extension of the lower drive hub 88. The upper driven column is a depending extension of the brake hub 69. The ends of the two columns abut opposite sides of a bearing 91 which permits relative rotation therebetween. A clutch spring 92 has respective upper and lower portions 92*a*, 92*b* which extend over the respective ends of the upper driven column and the lower drive column.

The clutch spring 92 is of the coil type and surrounds the respective circular drive transmitting columns. Rotation of the lower drive column 89 in one direction causes the clutch spring 90 to tighten and wrap around both columns. This effects transmission of drive from the lower column 89 to the upper column 90. Rotation of the lower drive column 89 in the opposite direction uncoils or loosens the spring so that drive is not transmitted to the upper column 90.

Figure 6:
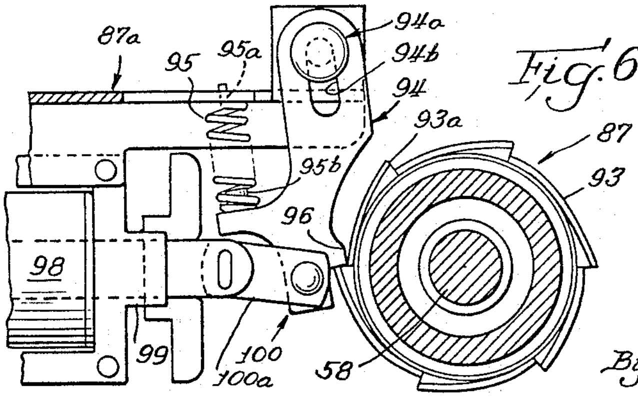
FIGURE 6 is a plan view of a clutch assembly of the drive mechanism of FIGURE 5, said view being taken along 6—6 in FIGURE 5.

Selective driving in the wrap around or drive direction is effected, in the exemplary embodiment, by using a clutch shield 93 extending about the spring 92 and holds an end 92*c* of the lower spring portion 92*b*. (See FIG. 5.) The sleeve 93 and spring 92 are selectively retarded against rotation, as shown in FIG. 6, by providing on the upper end of shield 93 a plurality of projecting ears 93*a* engageable by a clutch pawl 94. The pawl 94 is biased by a spring 95 so that a projecting finger 96 can engage one of the ears 93*a*. The result is that even though the spring 92 fits snugly about the lower drive shaft or column 89 it can be held stationary during rotation in a direction which would otherwise tighten the spring and effect drive from column 89 to column 90, thereby permitting precise, selective spin drive of the basket 19.

To engage the clutch spring 92, the shield 93 is released and the spring is permitted to wrap around the respective drive and driven columns 89, 90. It is, of course, understood that the driven column must be rotating in the proper direction to effect tightening of the spring about the respective columns (see FIG. 3). The pawl 94 is disengaged in the present instance by energizing a solenoid 98 which has an armature 99 connected by linkage assembly 100 to the clutch pawl and pivots the latter against the force of the biasing spring 95.

The motor 41 is reversible to rotate pump 55 and main drive shaft 58 in either direction. The motor has a start winding 41*a* and a pair of run windings 41*b*, 41*c* (see FIG. 16). Direction of rotation is determined by the relative polarity between the start and run windings, i.e. simply by reversing the relative polarity rotation of the motor is reversed. Only one run winding is used at a time, energization of winding 41*b* gives normal speed operation while winding 41*c* gives slow speed operation.

Figure 18:
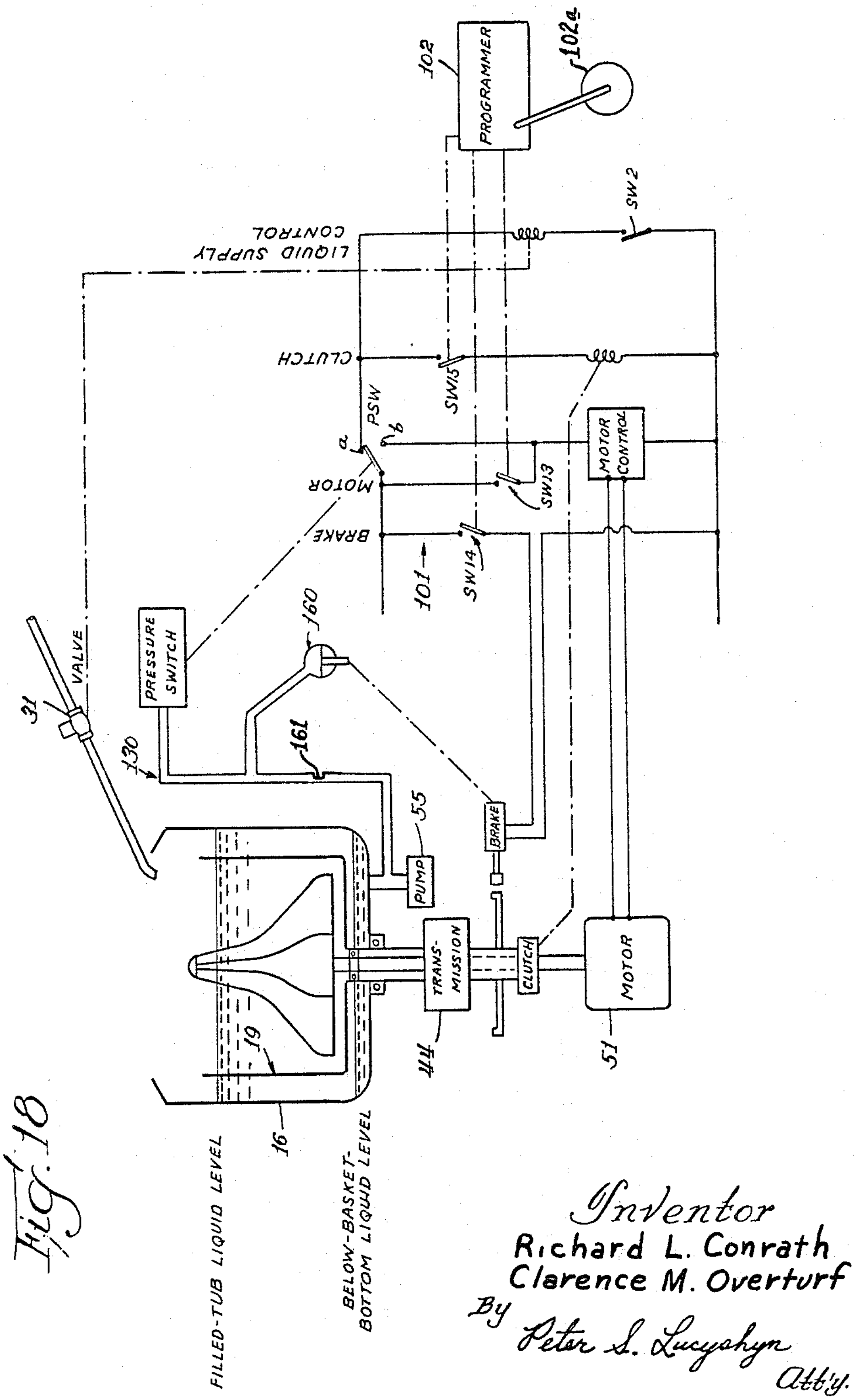
FIGURE 18 is a simplified illustration in diagrammatic form of the control circuit and operative units in the automatic washer of FIGURES 1–16.

Energization of the motor winding is controlled by a control circuit 101 in response to operation of a programmer in the present instance, a timer or sequential controller 102 (FIG. 18). As shall be explained in detail subsequently, timer 102 "instructs" circuit 101 by operating appropriate switches therein to control the washer operations as exemplarily set out on timer dial 102*a*, i.e. "wash" and "extraction," the latter including respective "rinse" and "spin dry" cycles.

Upon receiving wash or agitate instructions the control circuit 101 effects motor rotation in a forward direction to rotate the shaft 58 and thereby drive the transmission gear train through the one-way clutch 59 to oscillate the agitator 36.

In response to spin instructions the control circuit 101 reverses the direction of motor rotation. As explained, the transmission one-way clutch 59 is inoperative in the reverse direction of motor rotation, thus oscillatory drive is not transmitted to the agitator. The control circuit first energizes brake solenoid 84 to release brake 64 permitting free movement of the basket 19 and housing 50. Subsequently, upon operation of liquid level sensor switch 35, as explained in a later part of the specification, the circuit energizes the clutch solenoid 98 to engage clutch 87 so that a drive connection is completed for rotating the transmission housing and spinning the basket 19.

*Pump*

To recirculate water during the washing operation and to drain water prior to the spinning operation, the pump 56 is provided (see FIG. 4). This is a dual impeller pump having an upper impeller 103 and a lower impeller 104. The impellers are carried on a common shaft 55*a* the lower end of which holds the pulley 55 coupled to the motor by V-belt 52. In one direction of rotation the upper impeller recirculates water via a system 105 and in the opposite direction of rotation the lower impeller 104 drains water through a system 106.

Figure 12:
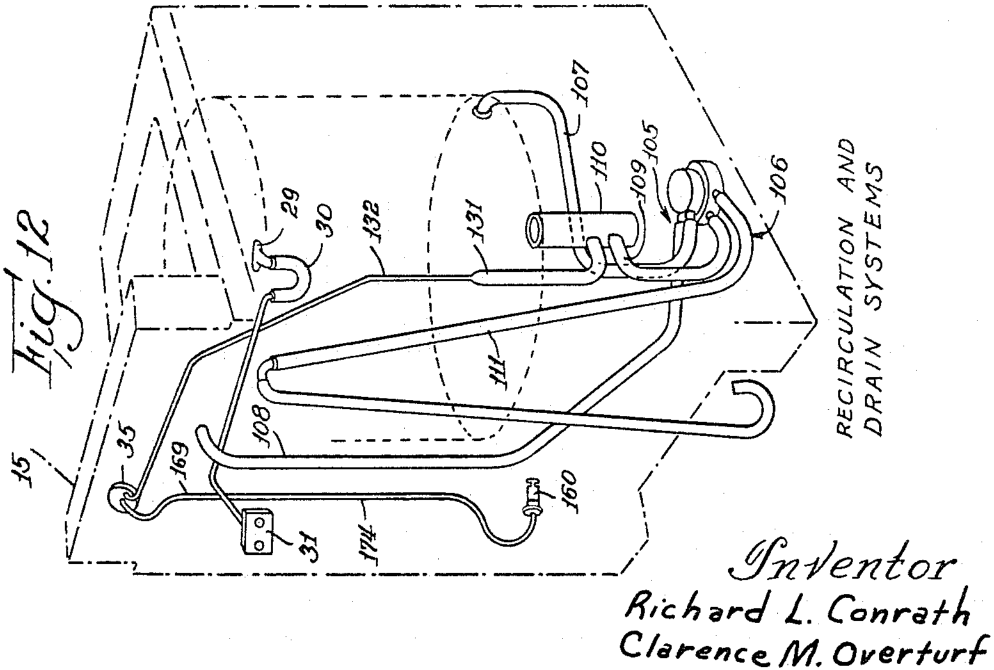
FIGURE 12 is a diagrammatic showing of the liquid flow and control system, including respective fill, recirculation and drainage flow lines in the washing machine.

The respective recirculation and drainage systems 105, 106 are best shown in FIG. 12. A hose 107 couples the recirculation impeller 103 to the lower part of the side of tub 16. The connection is just above the bottom of the tub so that soil, pebbles, and like materials are not recirculated. An output hose 108 returns the water to the tub 16 through a flume 108*a* located adjacent the tub top (see FIG 2).

To remove or drain liquid from the tub, control circuit 101 initiates reverse rotation of the motor to effect liquid pumping operation of drain impeller 104. A hose 109 couples the drain impeller to a sump 110 at the bottom of tub 16 to draw water out. The wash or rinse water is forced out by the lower impeller into a drain hose 111 and carried to an appropriate drain connection (not shown).

During forward rotation of pump pulley 55 and while upper impeller 103 is recirculating water in the tub, the lower impeller 104 is acting so as to draw air through hose 111. As preferably constructed the lower impeller 104 will not draw liquid from the sump 110 during forward rotation of pump pulley 56.

In the opposite direction of pump pulley rotation, reverse direction as occurs during spin operation of the washer and while lower impeller 104 is removing water from the tub, the upper impeller 103 is drawing air through hose 108. In the preferred embodiment, the upper impeller will not draw liquid from tub 16 during reverse rotation of pump pulley 56. The pump is described in further detail in Pinder, U.S. Patent No. 2,938,130 issued May 9, 1961.

*Control circuit*

As noted, the overall operation of the washing machine is controlled by the programmer 102 instructing a control circuit 101. The programmer is a time-motor TM operated unit which closes and opens respective contacts in timed sequence so as to effect specific operations in the control circuit. The timer structure is explained in further detail in copending application of Carl J. Knerr, Serial No. 254,640 filed January 29, 1963. In order to facilitate understanding of the programmer and control circuit a simplified diagram of the control system and coupled mechanical structure is presented in FIG. 18.

Figures 14, 15, 16:
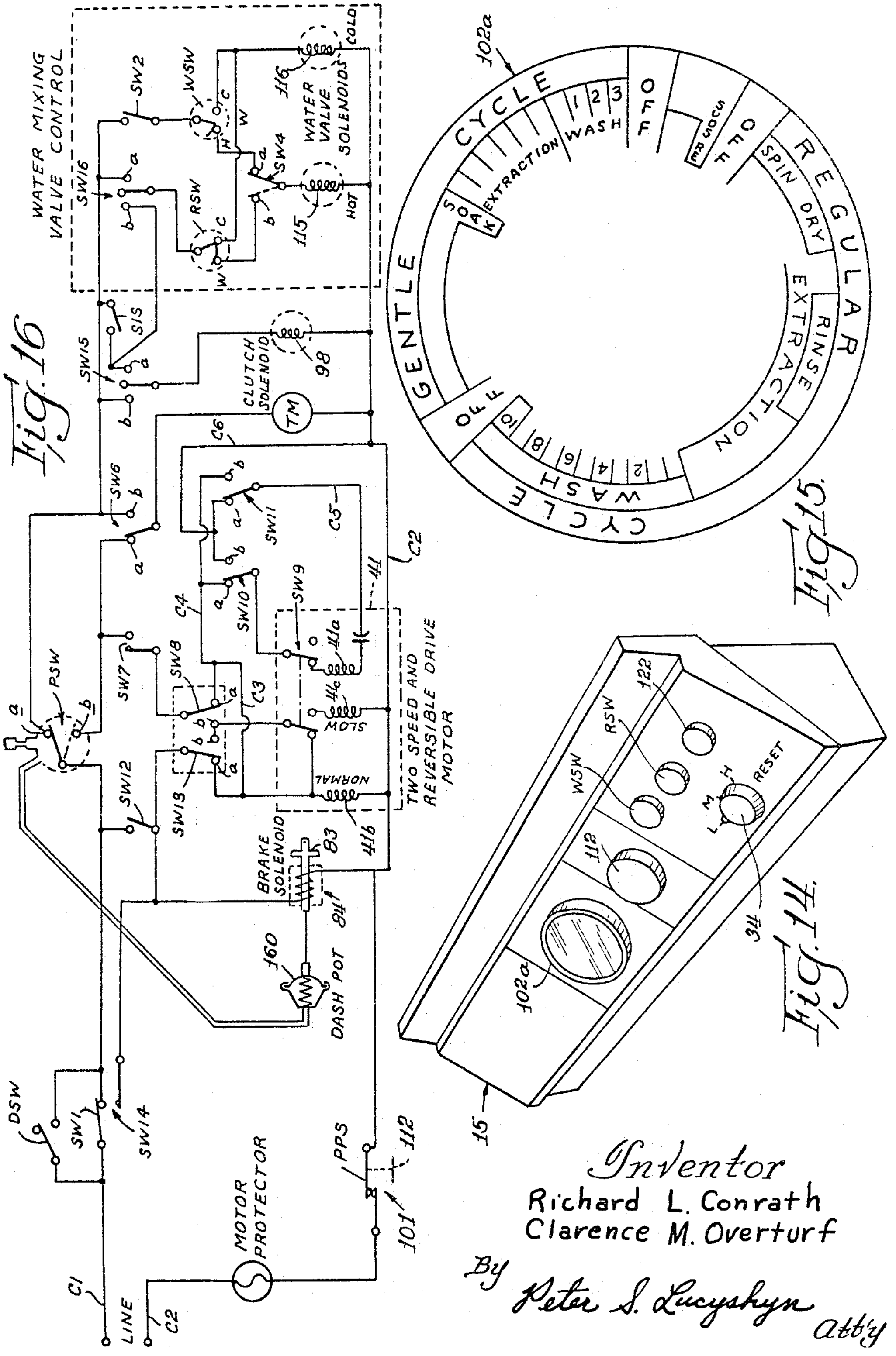
FIGURE 14 is a perspective of a washing machine backguard including programming and liquid level controls.
FIGURE 15 is an elevation of the programming control indicating different operations of two cycles of the washing machine.
FIGURE 16 is a schematic of the washing machine control circuit.
Figure 17:
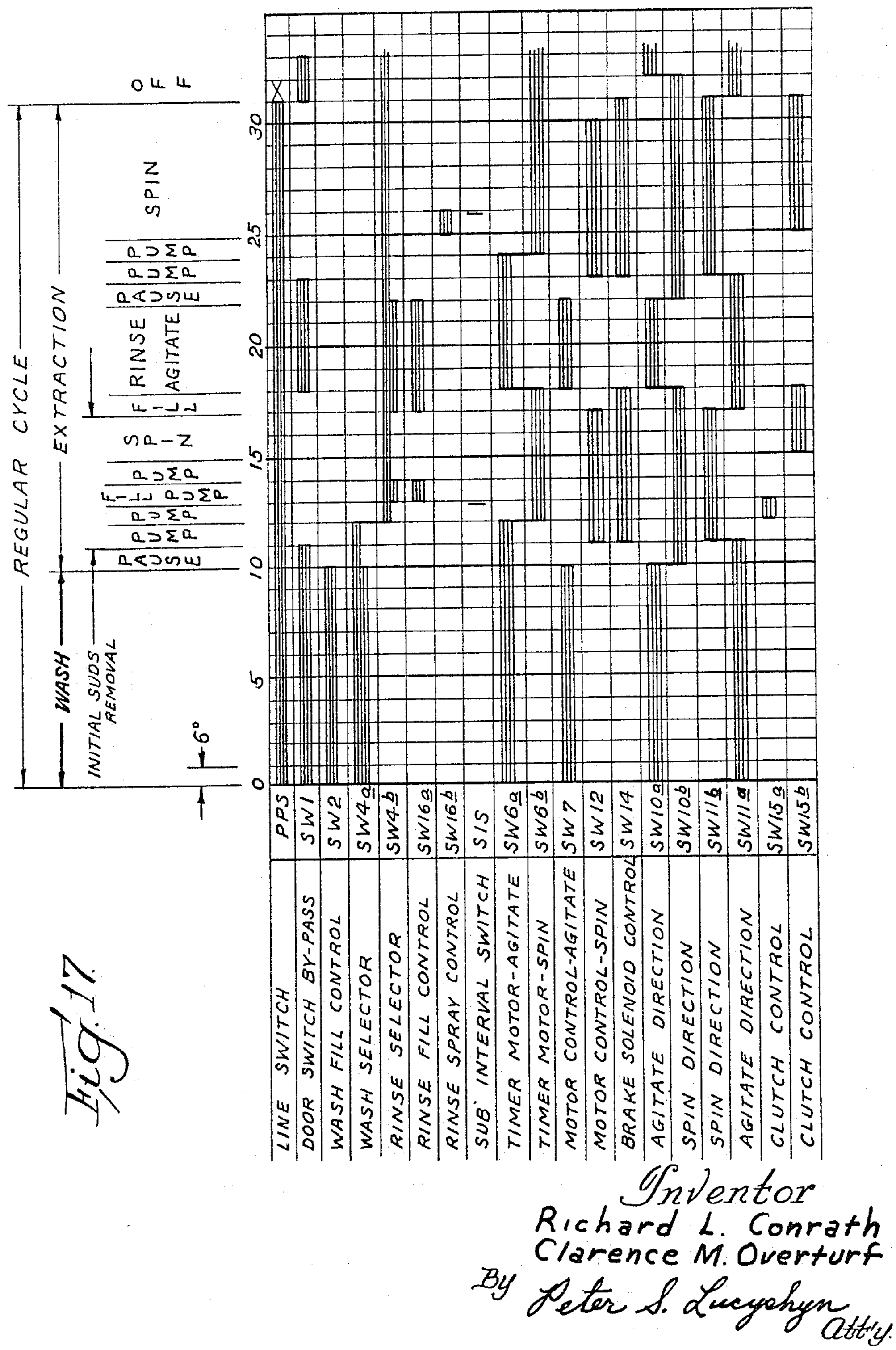
FIGURE 17 is a cam sequence chart illustrating the cycles of operation of the automatic washing machine of FIGURES 1–16, inclusive.

The timer sequence chart of FIG. 17 illustrates the contacts of switches that are opened and closed at any given position of timer operation. To establish exactly the electrical components functioning at any given time during specific cycles of machine operation, it is only necessary to establish which sequences are of interest and then to identify the switches that are closed as represented by the dark squares on the timer sequence chart. Each individual energizing circuit, during a given period, may thus be identified by using the timer sequence chart and referring to the switches in the electrical circuit schematic in FIG. 16.

Turning to the control circuit 101 and FIGS. 16, 17, and 18, it effects operation of the mechanical units of the washer in automatic sequence through a cycle of operation as set forth in the chart of FIG. 17. A source of electrical power represented by the term "line" between a pair of conductors C1, C2 energizes the circuit when contacts PPS of a manually operable push-pull switch 112 are closed. To provide an emergency stop when the machine top door 14 is opened, a door actuated switch having contacts DSW is provided. This is necessary during high speed spinning of basket 19 to prevent the person opening the door from being injured. The brake solenoid 84 is immediately deenergized to effect braking and the clutch solenoid 98 is deenergized to disconnect spin drive of the basket. It is desirable, however, during the wash and rinse operations of the machine cycle that access be permitted to the tub and basket without stopping the machine. Thus a set of door by-pass switch contacts SW1 are provided and, as shown in the chart of FIG. 17, these are closed during the wash and agitate operations of the machine.

The programmer 102 initially prepares the circuit 101 for feeding water into tube 16. The desired temperature of the wash water is selected by operating a knob 114 which controls a set of switch contacts WSW. The switch contacts can be moved to either of the following positions: where only a hot water valve solenoid 115 is energized; where only a cold water valve solenoid 116 is energized; or where both solenoids 115, 116 are energized to feed warm water into the tub. The respective hot and cold water valves are contained in the main water valve which is thereby coupled to the circuit so that water input to the tub can be controlled, either turning it on or turning it off. The energizing circuit for the water valve solenoids includes a contact assembly PSW of pressure switch 35, specifically a contact PSW*a*, and a pair of timer-operated switches SW1 and SW4, the latter having contacts *a* and *b* to provide selective isolation of the hot water supply during rinse operation of the machine. (C1–SW1–PSW*a*–SW2–WSW–SW4*a*–115 or 116–PPS–C2.) The pressure switch 35 remains on contact *a* until the water level in the tub is high enough to apply a pressure to the switch and put the switch on contact *b*. This deenergizes the water valve solenoids to close the valves and shut off the water flow. The details of the pressure switch are given later.

The motor windings 41*a*, 41*b*, 41*c* are selectively coupled to the energization source by the control circuit 101. The motor is rotated in the forward direction to effect agitation and recirculation in the machine when the pressure switch moves to contact PSW*b*. Explaining the motor energizing circuit, the timer instructs the closing of a switch contact SW7. A contact SW8*a* is normally closed and connected by a conductor C3 to the motor run winding 41*b*. The motor run winding energizing circuit includes (C1–SW1–PSW*b*–SW7–SW8*a*–C3–41*b*–PPS–C2). For energizing the start winding 41*a*, a pair of respective contacts SW10*a* and SW11*a* are normally closed. Contact SW10*a* is connected into the C1 side of circuit 101 by a conductor C4 and through a normally closed switch SW9 to start winding 41*a*. The winding 41*a* is connected to the C2 side of circuit 101 via a conductor C5, switch contact SW11*a* and a conductor C6 and the switch PPS (C1–SW1–PSW*b*–SW7–SW8*a*–SW10*a*–SW9–41*a*–C5–SW11*a*–C6–PPS–C2). The switch SW9 is responsive to motor speed, i.e. centrifugal switch, deenergizing the start winding when the motor reaches a predetermined speed. Switch contacts SW8*a*, SW8*b* are part of a motor speed selector 122. By operating speed selector 122 to close contact SW8*b* winding 41*c* is energized and a slow speed motor operation during the wash cycle can be obtained.

The timer motor TM powering the timer 102 is energized through a normally closed contact SW6*a* (C1–SW1–PSW*b*–SW6*a*–TM–PPS–C2).

Turning to the chart in FIG. 17, it is noted that in the exemplary regular cycle of operation, during the wash cycle the control circuit switch contacts SW1, SW2, SW4*a*, SW6*a*, SW7, SW10*a* and SW11*a* are closed. In the present instance the timer 102 maintains a wash cycle for 10 minutes. At the end of the cycle contacts SW2, SW7, SW10*a* are opened. There is a pause of 1 minute permitting the motor to decelerate and stop before it is energized for reverse rotation.

To reverse the motor, the timer closes contacts SW12, SW10*b*, SW11*b*. As is clear from the circuit diagram of FIG. 16, closing of contact SW12 completes an energizing circuit for the motor run winding 41b through a normally closed switch contact SW13a

(C1–DSW–SW12–SW13a–41b–PPS–C2)

The closing of contacts SW10b and SW11b reverses the phase of the power in start winding 41a as compared to what it was when contacts SW10a and SW11a were closed (C1–SW12–SW13a–C3–C4–SW11b–C5–41a–SW9–SW10b–C6–PPS–C2).

Switch SW13 is also a part of the speed selector 122 and either contact SW13a can be closed for normal motor speed operation or contact SW13b can be closed for slow motor speed operation. This provides a fast and slow drive to spin basket 19.

Reverse rotation of the motor, effected by the control circuit in response to spin instructions from the timer 102, stops recirculation operation of pump 56 and starts drain operation of impeller 104. Liquid is thereby removed from the tub.

As part of the spin instructions, the timer 102 closes a contact SW14 in the control circuit 101 to energize brake solenoid 84 (C1–DSW–SW14–84–PPS–C2). The by-pass switch SW1 is open making the switch DSW effective to deenergize the circuit 101 should the door be opened. In the energizing circuit for the clutch solenoid 98, contact SW15a is closed. However, the circuit 101 will not energize the clutch solenoid until the pressure switch contact PSW*a* is closed as well as a sub-interval switch SIS (C1–DSW–PSWa–SIS–SW15a–98–PPS–C2). The pressure switch 35 maintains contact PSW*b* closed and PSW*a* open until the liquid level in the tub is lowered to a predetermined point whereupon contact PSW*a* is closed. In practice it has been found to be advantageous to lower the liquid below the point at which connector 131 joins sump 110. As a part of a basket acceleration and coast operation explained later, the switch SIS is closed for a short time interval.

The timer motor TM is deenergized at the beginning of the spin cycle after reverse rotation of the motor 41 has begun and pump 56 is draining liquid from the tub. Denergization occurs when the timer 102 opens contact SW6a and closes contact SW6b. The timer motor is not energized again until the tub is empty and pressure switch contact PSW*a* is closed. Accordingly, there is not a fixed time in which the tub must empty.

*Liquid level sensor and control*

Figure 13:
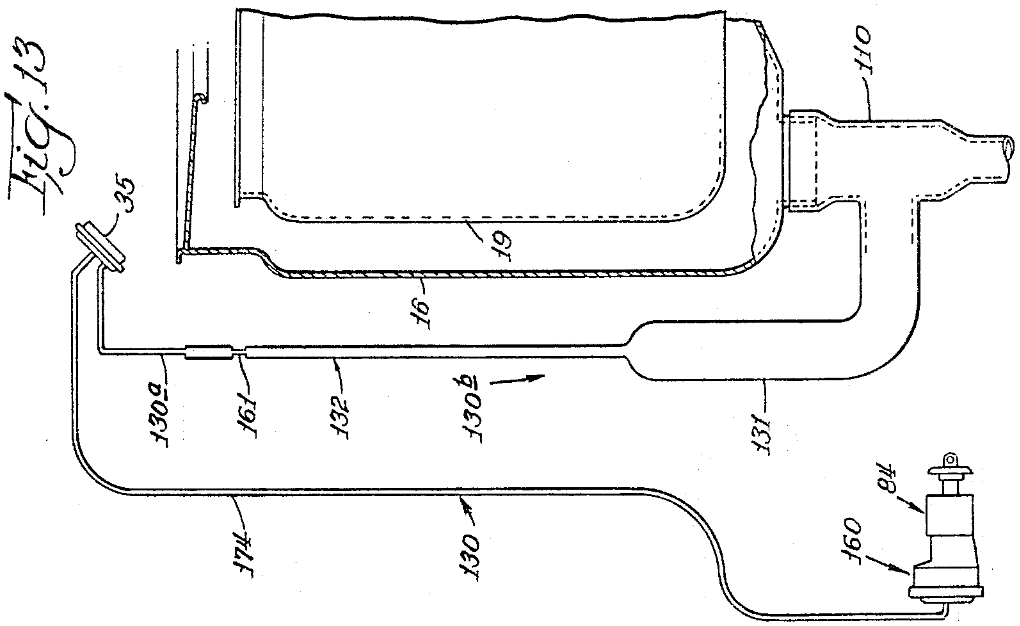
FIGURE 13 is a diagrammatic showing of the liquid level sensing and pneumatic clutch control arrangement.

To transmit tub liquid level information to control circuit 101 a tub liquid level sensor, in the present instance a fluid circuit 130, operates switch 35 (see FIG. 13). Because the illustrative sensor is of the pressure type a pressure type switch 35 is used. It is understood that other liquid level sensors could be utilized. The fluid circuit senses the water level as represented by a head of water in the tub 16 and transduces this information into a pressure in an air pressure tube 132. The latter is coupled to the drain sump 110 at the bottom of the tub by a connector conduit 131. Water seeking the same level in the fluid circuit 130 as in the tub 16 traps air in the upper portion of the tub 132 and compresses it.

Figure 11:
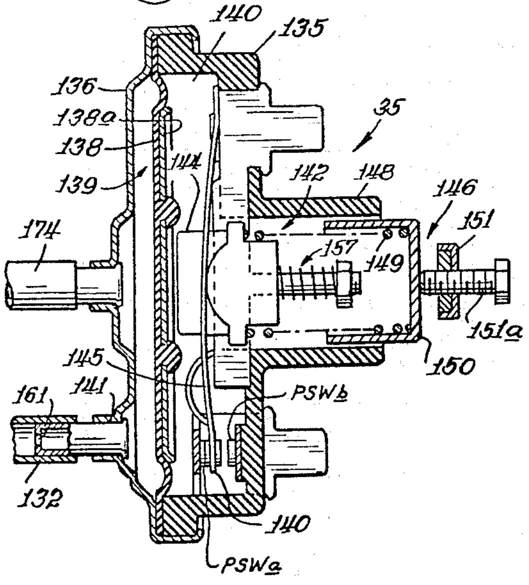
FIGURE 11 is a sectional view of the pressure switch taken along 11—11 in FIGURE 10.
Figure 10:
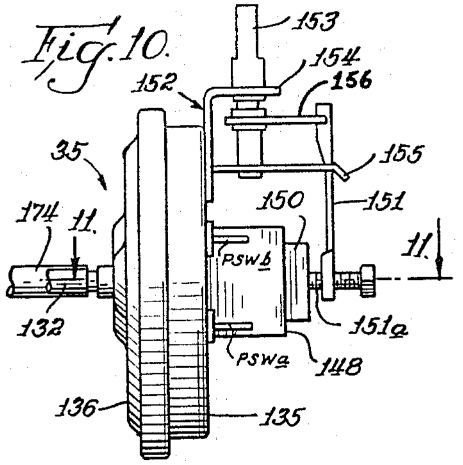
FIGURE 10 is an elevational view of the pressure switch of FIGURE 9.

As best shown in FIGS. 9, 10, and 11, the air tube 132 is connected to transmit the air pressure therein to pressure switch 35 and operate contacts PSW*a* and PSW*b*. In the present instance the pressure switch includes a hub-shaped annular body 135 having opposite open ends with a complementarily shaped and generally concave cover 136 fitted over the larger of the open ends. A diaphragm 138 of flexible material, for example rubber, is installed to form a wall between the body 135 and cover 136 and define a pair of separated chambers 139, 140 within the body-cover enclosure.

The fluid circuit tube 132 is coupled to a fitting 141 carried by the cover 136. Accordingly, air pressure variations in the fluid circuit effected by changes in the tub water level are applied as a force to flex the diaphragm 138. To prevent momentary pressure build-ups resulting, for example, from a toroidal column of water created about the tub sides during spinning of the basket, from acting on the diaphragm an orifice 161 is provided in fluid line 132. The restriction to air flow thereby effected absorbs surges of pressure due to transsients liquid level conditions in the lub.

Responsive to movements of the diaphragm is a switch mechanism 142 in chamber 140 including a slidable switch block 144 operating a movable snap or toggle switch element 145 which closes respective ones of the pressure switch contacts PSW*a*, PSW*b*. The switch block is biased by a spring assembly 146 to act against the pressure force applied to diaphragm 138 and transmitted to the block by a plate 138a centrally carried by diaphragm 138.

The block 144 and spring assembly 146 are carried in a rearwardly extending cylindrical portion 148 of the switch body 135, the block 144 being biased toward the diaphragm 138 by a spring 149. The rear end of spring 149 is received in a cap 150 and both fit into the cylindrical opening in rear body portion 148. A lever and screw 151, 151a respectively, act on the cap to maintain a spring force on the block.

Manual selection of spring compression and thereby the pressure necessary in fluid circuit 130 to actuate switch contacts PSW to close contact PSW*b* is made by pivotally positioning lever 151. To this end a bracket 152 is mounted on the switch body 135 and a control shaft 153 is rotatably carried between upstanding arms 154, 155. Lever 151 is pivotally supported by arm 155 and shaft 153 carries a cam 156 having a camming surface 156a engaging one end of lever 151 to pivot it and apply or release compressive force on spring 149. The rotatable water lever control 34 is connected to the shaft 153 and, in the present instance, can be manually turned to one position rotating the shaft and compressing the spring so that the switch does not trip until the tub is filled to a "high" level or turned to other respective positions releasing the spring and thereby adjusting the controls for automatic fill of the tub to "medium" or "low" levels, respectively. The screw 151a permits initial adjustment of the pressure switch so that the respective water levels at which the switch 35 trips, i.e., low, medium and high, correspond to desired water levels in the tub.

After the movable element 145 in switch 35 is actuated and contact PSW*b* is closed in response to the tub filling with liquid to a predetermined "high" level or point, the contact remains closed until the liquid is lowered whereupon the switch resets or returns to contact PSW*a*. In other words, the element 145 is actuated from a first position, contact PSW*a* closed, to a second position, PSW*b* closed and PSW*a* open, in response to a selected high liquid level in the tub. To provide a substantially constant reset or return pressure corresponding to a predetermined low liquid level in the tub and sump, the switch block 144 is biased by a second independently adjustable spring assembly 157. Thus, regardless of what pressure is required to trip the switch and stop liquid input to the tub, the switch will not return from its second or tripped position, PSW*b* closed, to its first or reset position, PSW*a* closed, until the pressure is below a predetermined value corresponding to a predetermined low liquid level.

It is clear from the foregoing that in the ordinary operation of the washer, the liquid level sensor switch 35 is actuated to its second position when the tub is filled to the selected level. This occurs before spin instructions are transmitted to the control circuit 101, indeed before the wash-agitate cycle begins. When the liquid level is lowered below a predetermined point, the switch 35 returns or resets to its first position and circuit 101 is ready to engage clutch 87.

Assume, however, that the sequential control dial 102*a* is advanced to the "spin" position by a housewife having decided not to wash her clothes during filling of the tub and while switch contacts PSW of switch 35 are still in their first position. As noted, the contacts PSW of switch 35 in their first position effect spin drive of the basket. This would flush the liquid out of the tub and most likely overload the motor.

To prevent the occurrence of these events, the preferred embodiment utilizes a safety control to insure that the liquid level in the tub is lowered to a predetermined low level before the spin drive to the basket is engaged to prevent spinning of the basket when the tub is partially filled with liquid. The safety control is the subject of a copending application of Carl J. Knerr, Serial No. 371,245, filed June 1, 1964.

As herein illustrated, the safety control includes a supplemental pressure creating means, exemplified by dashpot 160, to actuate pressure switch contacts PSW from their first position, maintained during filling of the tub, to their second position, assumed ordinarily when the tub is filled to the selected level. Thus, in effect, the safety control simulates a high liquid level condition in tub 16.

As can be seen from the circuits in FIGS. 16 and 18, the respective first and second switch positions are here shown as PSW*a* and PSW*b* respectively. The clutch solenoid cannot be energized until the switch PSW is actuated or "reset" and contact *b* is opened while contact *a* is closed. This occurs only after the pressure applied to pressure switch 35, including the water level pressure and the supplemental pressure, bleeds down from fluid circuit 130. Bleeding of the air pressure occurs as the head of liquid in the tub is lowered by the pump 56. Drain operation of the pump occurs immediately upon the feeding of spin instructions to circuit 101. The orifice 161 is helpful in restricting the escape of fluid out of a pressure switch portion 130*a* of fluid circuit 130. Thus, operation of the dashpot 160 in setting the switch contacts PSW is added.

Figure 8:
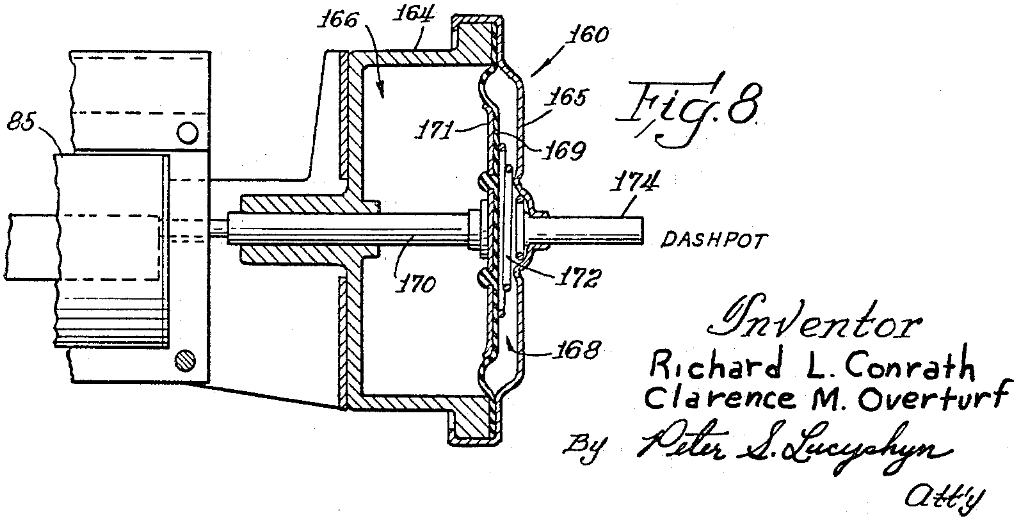
FIGURE 8 is a sectional view of a control for the clutch assembly shown in FIGURE 6, said view being taken along 8—8 in FIGURE 7.

Describing the supplemental pressure creating dashpot 160, as best shown in FIG. 8, it includes a housing 164 and a cover 165 which, assembled, define a pair of enclosures 166, 168 separated by a movable diaphragm 169, in the present instance constructed of suitable flexible material such as rubber. To effect operation of the dashpot in response to spin instructions from the programmer, in the illustrative embodiment a shaft 170 is slidably received in an end wall of the housing 164 and couples the brake solenoid armature 85 to the diaphragm 169. The diaphragm 169 has a centrally positioned plate 171 of inflexible material which the end of shaft 170 acts upon. The diaphragm 169 is biased in a normal position by the spring 172 in the chamber 168.

Upon actuation of the brake solenoid armature initiated by spin instructions from the programmer, the shaft 170 acts against the diaphragm plate 171 and the biasing force of spring 172 to move the diaphragm and force air through a conduit 174 coupling the dashpot 160 to the pressure switch 35 and the tube 132 of the fluid circuit 130. The fluid circuit is divided by orifice 161 into the pressure switch portion 130*a* and a tub portion 130*b*. As here shown, in order to most efficiently utilize the movement of dashpot diaphragm 169 to apply a force on pressure switch diaphragm 138 the dashpot 160 is connected into the pressure switch side 130*a* of fluid circuit 130. Thus, the pressure impulse effected by operation of the dashpot 160 acts on the diaphragm 138 of pressure switch 35 to set the contacts PSW in their high liquid level position.

The present invention is particularly useful if the house-advances the timer knob 102*a* to spin operation during filling of the tub either in the wash cycle or in the rinse-agitate cycle. Such advances of the knob 102*a* feed spin instructions to the control circuit 101 while the pressure switch PSW is still in its first or empty position and the circuit would respond by coupling the second drive train for spinning the basket while the tub is still partially filled with liquid. The present invention assures that the basket is not spun until the liquid in the tub is lowered to the predetermined "low" level. The safety control sets the liquid level sensor switch in the tripped or high liquid level position so that the washer proceeds through the customary cycle of liquid removal before the spin drive to the motor is engaged.

The terms "high" liquid level and "low" liquid level used in describing responsive movements of switch PSW in senisng liquid level in tub 16 are not to be confused with marked settings for the water level control 34. The "H," "M," and "L" settings of the latter identify relative levels to which the tub is filled before switch PSW is actuated. Thus, even though the relative tub liquid level may be low because the control is set to "L," the switch PSW senses the top of the tub liquid level as a "high" liquid level. The reset bias assembly 157 in the pressure switch 35 assures that the same low liquid level trips the switch upon each lowering of the liquid level in the tub.

The regular cycle of operation for a washer has been explained up to the point where the programmer 102 has instructed control circuit 101 to energize motor 41 so it rotates in reverse thereby operating pump 56 to remove wash water from the tub 16. The circuit has been prepared to effect spin rotation of basket 19. That is switch SW14 is closed energizing brake solenoid 84 and releasing the second drive train for transmitting drive to the basket, and clutch solenoid switch contact SW15*a* is closed. The liquid level sensor switch PSW is in its first position with contact PSW*a* closed. The timer motor TM has been deenergized to allow the pump 56 all the time it needs to remove the liquid from tub 16. When the pressure switch resets to its first position the timer motor is again energized to operate its associated cams in programmer 102. At a preset time in the washer cycle, the timer actuates the sub-interval switch SIS, and since contact PSW*a* is closed the clutch solenoid is energized and the clutch engaged to spin the basket.

In order to effect initial suds removal including wash water trapped in the clothes after the pump 56 has drained the tub, the following procedure is followed for spinning the basket and introducing rinse liquid. The structure and procedure is the subject of a copending application of R. Waldrop, Serial No. 371,670, filed June 1, 1964. First, even though switch SW15*a* is closed, the clutch solenoid 98 is not energized until the timer actuated sub-interval switch SIS is closed. In the present instance the switch SIS is closed for 15 seconds to accelerate the basket to a portion of full speed and then coast. During this acceleration and coast period wash water and suds trapped in the clothes are ejected by centrifugal force.

A switch contact SW16*a* is closed after the basket has been accelerated and while it is coasting to operate the water valve solenoids 115, 116 and introduce fresh water through valve 31 for one minute into the tub thereby diluting the suds and wash water and preventing suds-lock. The temperature of the rinse water is selected by adjustment of a rinse water switch RSW which operates in the same manner as the wash water switch WSW, previously explained. Preferably only cold water is used in this rinse operation. As is clear from the sequence chart of FIG. 17, while the switch SW16*a* energizes the water valve solenoids through the rinse water temperature selector switch RSW and switch contact SW4*b*, the motor is rotating in the reverse direction and, even though the basket is not connected thereto because the clutch solenoid 98 is not energized, the pump 56 is operating in reverse removing the rinse and wash water from the tub.

The pump operates for the full six minutes of the "Initial Suds Removal" washer program period. Because the motor is operating at full speed, except when slowed down during the interval engagement of clutch 98, the pump 56 is operating at full capacity. This assures efficient and quick removal of sudsy liquid and further aids in preventing suds lock. This empties the tub and prepares the machine for subsequent spinning of the basket.

For the last two minutes of the Initial Suds Removal period the basket is spun to force out additional amounts of suds and wash water after the spray down with fresh water. To effect spinning, as is shown in the chart of FIG. 17, the switch SW14 energizing the brake solenoid is closed and the brake is released so it is only necessary to engage clutch 87. To energize the clutch solenoid 98 independently of sub-interval switch SIS, switch SW15 is moved so as to close contact *b* thereby connecting clutch solenoid 98 across electrical source C1–C2 (C1–DSW–PSW*a*–SW15*b*–98–PPS–C2).

After the two minute spin completing the Initial Suds Removal period, the motor switch SW12 is opened for one minute to permit the motor to coast to a stop. During the last minute the rinse water switch contact SW15*a* is closed hereby operating water input control valve 31 and filling the tub with rinse water. The liquid level sensor 130 operates switch 35 and closes contact PSW*b* when the rinse water in the tub has reached a level corresponding to that preset by liquid control 34.

Next the timer operates the contacts SW7, SW10, SW11 to energize motor 41 for rotation in a forward direction. The first drive train is operative to oscillate the agitator while the tub is full of rinse water. As can be seen from the chart of FIG. 17 the brake solenoid switch SW14, the clutch solenoid switch SW15 are open. Thus the solenoids are deenergized and the circuit 101 is in the same state as it was during the "wash" cycle except that the wash water switch contact SW16*a* is closed. While the motor is rotating in the forward direction, the recirculation system 105 of pump 56 is operative.

The rinse agitate cycle continues for four minutes whereupon the forward or agitate direction motor control switch contact SW7 is opened by timer 102 deenergizing the motor and stopping the agitator. There is a one minute pause before the next operation.

As a last step the motor is rotated in reverse by closing motor control switch contact SW12 and contacts SW10*b*, SW11*b*. (The energizing circuit has been described before.) The liquid removal system 106 of pump 56 is put into operation to empty the liquid from tub 16. The brake solenoid 84 is energized by closing contact SW14 releasing the second drive train for spinning the basket 19. The liquid level sensor switch 35 is actuated when the tub empties, opening contact PSW*b* and closing contact PSW*a*, and clutch control switch contact SW15*b* is closed completing a circuit for energizing clutch solenoid 98 and engaging the second drive train. The basket 19 is spun, in the illustrated washer program, for six minutes. During this time the pump 56 is operated, the drain system 106 being utilized to remove liquid from tub 16.

To permit manual selection of washer programs as set out on the dial 102*a*, a mechanical coupling (not shown) is provided between the control knob 112 and the dial. Turning the knob effects rotation of the dial to selected programs as shown by legends on the dial 102*a*.

What is claimed is:

1. In a washing machine having a tub for holding a liquid, a spinnable basket rotatably mounted in the tub for receiving articles to be washed, an agitator in said basket, a motor operable in either forward or reverse direction and respective agitate and spin drive trains, each drive train operative only in one of respective opposite directions of rotation of said motor, a brake assembly for effecting selective braking of said basket against rotation comprising in combination, first braking means carried by said spin drive train and rotatable therewith, second braking means positioned for selective engagement with said first braking means for effectively retarding rotation thereof, a tang carried by said second braking means having respective opposite agitate and spin control faces engageable upon rotation of said second braking means in respective opposite agitate and spin directions, a latch pivotally mounted for selective movement toward and away from said second braking means and a finger having respective opposite agitate and spin-control faces carried by said latch, said brake tang spin face and said latch finger spin-control face complementarily formed to concentrate engagement forces so as to permit engagement at high speeds and thereby effectively stop basket rotation.

2. The combination of claim 1 wherein said spin-control face on said tang is undercut for selective engagement with said latch finger spin-control face without throwing out said latch thereby permitting effective stopping of rotation of the spin drive train even at high speeds.

3. In a washing machine having a tub for holding a liquid, a spinnable basket rotatably mounted in the tub for receiving articles to be washed, an agitator in said basket, a motor operable in either forward or reverse direction and respective agitate and spin drive trains, each drive train operative only in one of respective opposite directions of rotation of said motor, a braking assembly for effecting selective braking of said basket against rotation comprising in combination, first braking means carried by said spin drive train for rotation therewith, second braking means positioned for selective engagement with said first braking means for effectively retarding rotation thereof, a tang carried by said second braking means having respective opposite agitate and spin-control faces engageable upon rotation of said second braking means in respective opposite agitate and spin directions, a latch pivotally mounted for selective movement toward and away from said second braking means, and a finger having respective opposite agitate and spin-control faces carried by said latch and complementarily formed to engage said corresponding agitate and spin-control faces on said second braking means, said latch having a recess adjacent said finger agitate face to hold said basket against rotation in both directions during agitate operation of said machine.

References Cited by the Examiner

UNITED STATES PATENTS 2,946,409 7/1960 Jennings ........... 68—23 X
3,100,030 8/1963 McMillan ......... 68—23 X WILLIAM I. PRICE, *Primary Examiner.*